(12) United States Patent
Feng

(10) Patent No.: US 11,600,167 B2
(45) Date of Patent: Mar. 7, 2023

(54) DETECTING DEVICE HAVING A PLURALITY OF DETECTING PORTIONS WORKING AUTOMATICALLY OR BY SELECTION

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Pin-Jen Feng, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/577,768

(22) Filed: Jan. 18, 2022

(65) Prior Publication Data

US 2022/0406167 A1    Dec. 22, 2022

(30) Foreign Application Priority Data

Jun. 16, 2021 (CN) .......................... 202110666463.1

(51) Int. Cl.
*G08B 25/14* (2006.01)

(52) U.S. Cl.
CPC .................................. *G08B 25/14* (2013.01)

(58) Field of Classification Search
CPC ....................................................... G08B 25/14
See application file for complete search history.

(56) References Cited

U.S. PATENT DOCUMENTS

| 11,232,690 B2* | 1/2022 | Shepard ................ G08B 25/08 |
| 2005/0286220 A1* | 12/2005 | Moore ............... H05K 7/20836 |
| | | 361/679.46 |
| 2007/0131756 A1* | 6/2007 | Hall ...................... G06F 1/1632 |
| | | 235/375 |
| 2012/0033416 A1* | 2/2012 | Ballard ............... F21V 23/0421 |
| | | 362/202 |
| 2017/0363451 A1* | 12/2017 | Basheer ................. G01N 33/24 |

* cited by examiner

*Primary Examiner* — John A Tweel, Jr.
(74) *Attorney, Agent, or Firm* — ScienBiziP, P.C.

(57) ABSTRACT

A device for detecting household conditions and events includes a power supply portion and a plurality of portions able to detect different conditions, or changes in different conditions. Each detecting portion includes an input port and an output port, the output port of one detecting portion is detachably electronically connected to the power supply portion, and the input port of one detecting portion is detachably electronically connected to the output port in a modular fashion of another detecting portion, the remote selection of a specific required detection is also provided.

18 Claims, 7 Drawing Sheets

DETECTING DEVICE HAVING A PLURALITY OF DETECTING PORTIONS WORKING AUTOMATICALLY OR BY SELECTION

FIELD

The subject matter herein generally relates to environmental controls, especially relates to a detecting device having a plurality of detecting portions.

BACKGROUND

Generally, a detecting device can only detect a single and specific condition, limiting detection to applicable scenarios. When multiple conditions need to be detected or composite detection is required, one detecting device is often not enough. Several detecting devices are needed, which is not only inconvenient, but also increases cost.

BRIEF DESCRIPTION OF THE DRAWINGS

Implementations of the present technology will now be described, by way of embodiments with reference to the attached figures.

DETAILED DESCRIPTION

Figure 1:
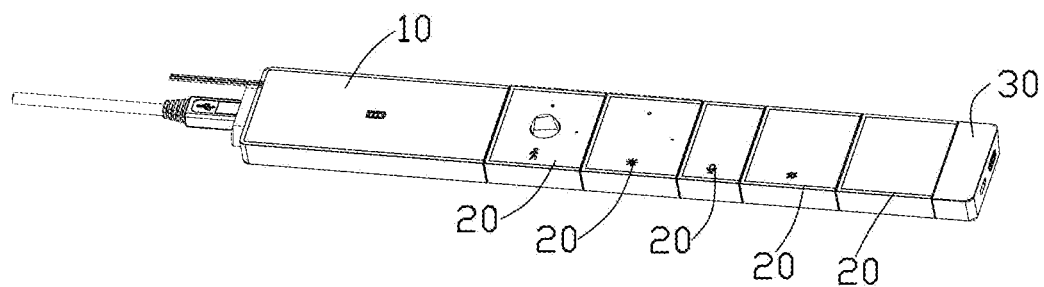
FIG. 1 is a schematic diagram of a detecting device having a plurality of detecting portions.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better show details and features of the present disclosure. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. References to "a plurality of" and "a number of" mean "at least two."

Figure 2:
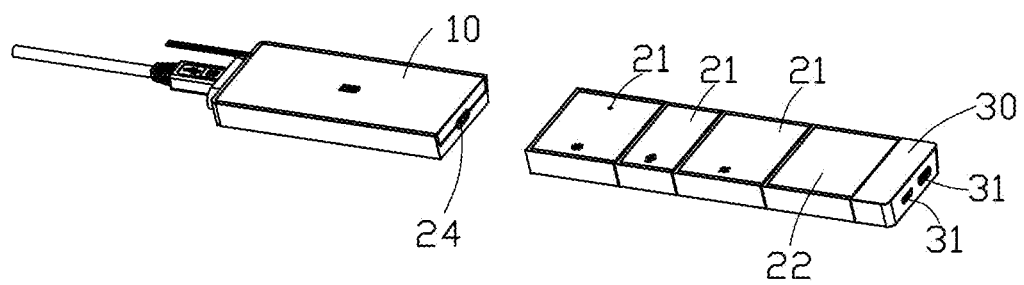
FIG. 2 is an exploded diagram of the detecting device in FIG. 1.
Figure 3:
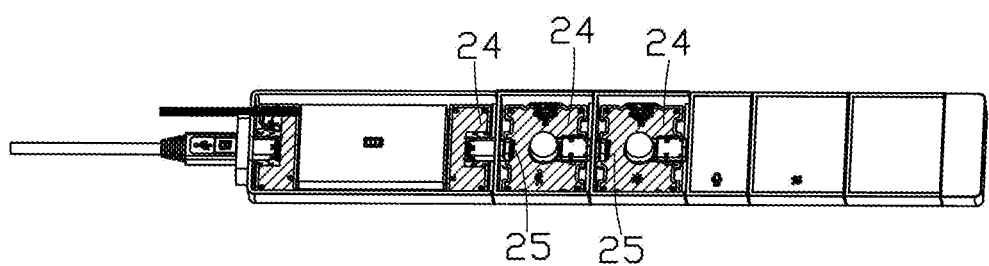
FIG. 3 is a schematic diagram of the internal structure of the detecting device in FIG. 1.

Referring to FIGS. 1 to 3, a detecting device 100 is provided. The detecting device 100 includes a power supply portion 10 and a plurality of detecting portions 20. Each detecting portion 20 is connected to the power supply portion 10, and each detecting portion 20 includes an input port 25 and an output port 24. Each detecting portion 20 is detachably electronically connected to the power supply portion 10, and any two detecting portions 20 can be detachably electronically connected to each other through the input port 25 and the output port 24.

It should be explained that the detecting portion 20 is modularized, and the output port 24 and input port 25 of each detecting portion 20 are cross-matched and can be connected with each other, so that each detecting portion 20 can be connected with each other, so as to configure the corresponding detecting portion 20 according to the scene requirements, and realize the detection of different conditions and the selection of specific feedback. The power supply portion 10 may be a battery for supplying power to other portions. In this embodiment, the output port 24 is connected to the input port 25 through the through hole on the shell of the detecting portion 20 in a concave-to-convex shape matching.

In one embodiment, the detecting portions 20 include first type portions 21, second type portions 22, and third type portions 23. The first type portion 21 is used for detecting preset conditions, the second type portion 22 is used for outputting detections, and the third type portion 23 is used for controlling conduction paths of circuits in the detecting device 100.

It should be explained that the first type portion 21 can be selected from various detectors for detecting preset conditions and outputting signals as to detection. The second type of portion 22 is response module, for responding according to the detection signal, and to realize visualization and/or hearing of a detection or realize the corresponding output, so as to inform the user of the detection. The third type portion 23 controls the detecting device 100 to activate or deactivate each functional portion. During implementation, the first, second, and third type portions 23 are set at the same time to ensure the functions of detection, response, and control.

In one embodiment, the first type portion 21 includes one or more of a biological detector relevant to humans, an optical detector, a combustible gas detector, a carbon monoxide detector, an ultraviolet detector, a tilt detector, and a carbon dioxide detector.

It should be explained that the first type portion 21 can include but is not limited to the above detectors, and the user can select a detector according to need.

In one embodiment, the second type portion 22 includes one or more of a light-emitting portion, a buzzer, other alarm.

It should be explained that the second type portion 22 can be a device that converts the detection into, but not limited to, sound, light source, and electrical signal, so as to realize timely presentation of the detection and make it convenient for the user to obtain the detection information.

In one embodiment, the third type portion 23 includes a switch controller 231. The switch controller 231 switches circuits on or off in the detecting device 100.

It should be explained that the detecting portions 20 on the detecting device 100 are connected in series, and the signal of each detecting portion 20 is transmitted to the detecting portion 20 which is next connected. Therefore, the switch controller 231 can turn on or off the circuit path at any position, and control the switch without affecting an arbitrary connection and free configuration.

In one embodiment, the third type portion 23 further includes a wireless receiver 232, which is arranged on the switch controller 231, and the wireless receiver 232 receives control signals from the switch controller 231.

The wireless receiver 232 allows remote control by the user of the switch of the detecting device 100 by receiving a control signal, which makes the control of the detecting device 100 more flexible and convenient and expands the application scenarios.

In one embodiment, the detecting device 100 further includes an external output module 30, which is provided with the input port 25 and an external port 31 opposite to the input portion 25. The input port 25 of the external output module connects the output port 24 of the function portion 20 to receive the signal from the function portion 20, and the external port 31 connects the external device and outputs the signal between the function portion 20 and the external device.

In one embodiment, the external port 31 includes a type-C port and/or a micro USB port. The external port 31 can be a type-C port and/or a micro USB port, and/or other general specification ports, and can be connected to other devices, such as fans, USB speakers, USB pumps, etc.

Figure 4:
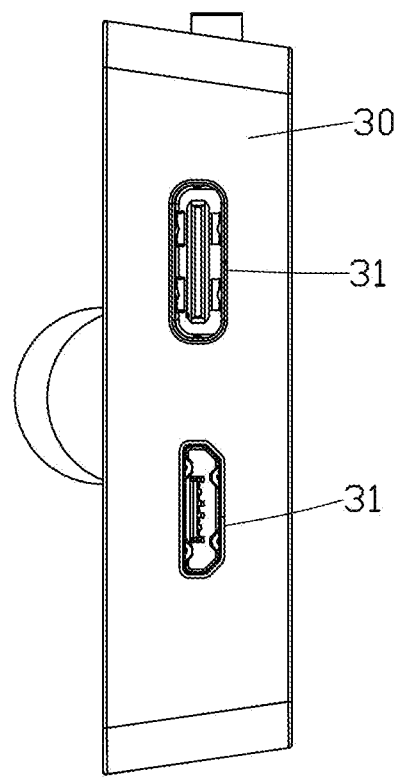
FIG. 4 is a schematic side view of the detecting device in FIG. 1.

Referring to FIG. 4, in one embodiment, the cross section of the detecting device 100 can be trapezoidal in shape, but is not limited to trapezoidal.

It should be explained that the cross section of the power supply portion 10 and each detecting portion 20 is trapezoidal, which is convenient for the user to hold in the hand in processes of installation, disassembly, and use, and effectively reduces the probability of impacts on being dropped.

In one embodiment, the power supply portion 10 includes a power supply port and a charging port. The power supply portion 10 can be a battery, which can supply power to the detecting device 100 through the power supply port, or can store and receive electric energy through the charging port.

In use, the user selects appropriate function portion 20 according to the condition to be detected in a scene and the appropriate output mode, and connects function portion 20 to the power supply portion 10 in turn. When the first type portion 21 detects the condition, or a change in a condition, the second type portion 22 receives the signal and responds accordingly. It should be explained that when a plurality of first type portions 21 are connected in series, when any condition occurs or changes, an electrical signal will be sent to make all second type portions 22 respond.

The present application is further explained below through an embodiment.

First Embodiment

Figure 5:
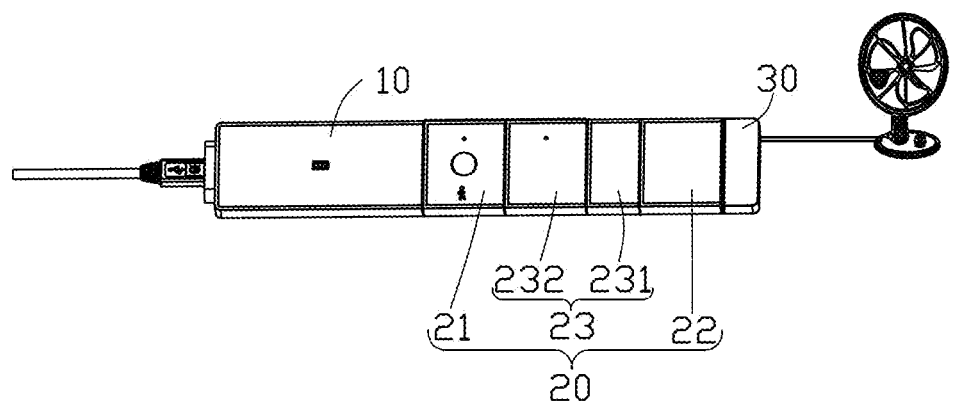
FIG. 5 is a schematic diagram of the detecting device in FIG. 1 used in a first scenario.

Referring to FIG. 5, in the first embodiment, the power supply portion 10, the first type portion 21, the third type portion 23, the second type portion 22 and the external port 31 are connected in succession, wherein the first type portion 21 includes a human body detector, the third type portion 23 includes a wireless receiver 232 and a switch controller 231, and the second type portion 22 includes an LED light, the external port 31 being connected with a fan. When in use, the human body detector detects the target location. When there are people at the target location, the human body detector outputs detection signals to other subsequent portions. After receiving such detection signals, the LED light lights up, and the fan or one fan is turned on automatically. This embodiment allows light and air-moving services when there are people in the target location.

Second Embodiment

Figure 6:
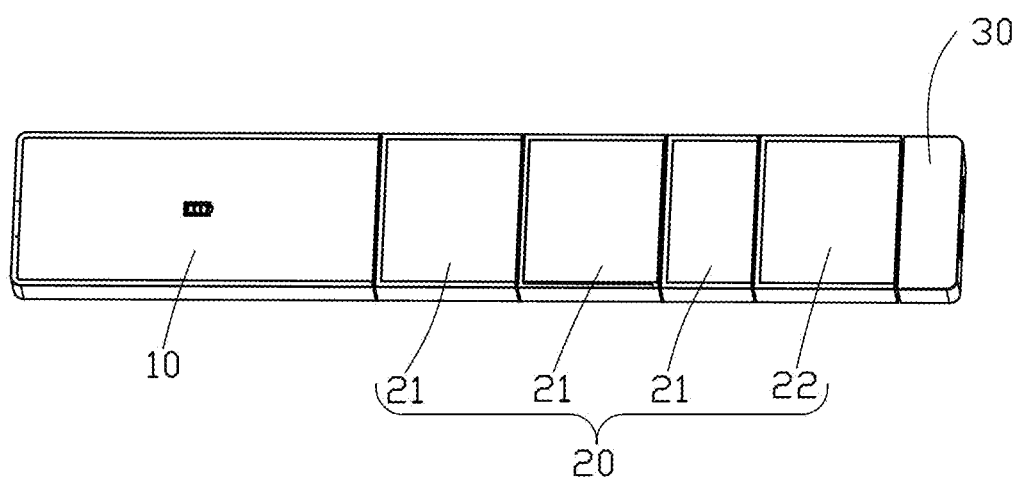
FIG. 6 is a schematic diagram of the detecting device in FIG. 1 used in a second scenario.

Referring to FIG. 6, in the second embodiment, the power supply portion 10, the first type portion 21 and the second type portion 22 are connected successively, wherein the first type portion 21 includes combustible gas detector, carbon monoxide detector, and carbon dioxide detector, and the second type portion 22 includes buzzer. When in use, the combustible gas detector, carbon monoxide detector, and carbon dioxide detector continuously examine the environment. When the concentration of a detected condition exceeds a standard, the detector sends a signal to sound the buzzer. This embodiment allows monitoring of smoke, gas leakage, and other dangerous situations in a specific area.

Third Embodiment

Figure 7:
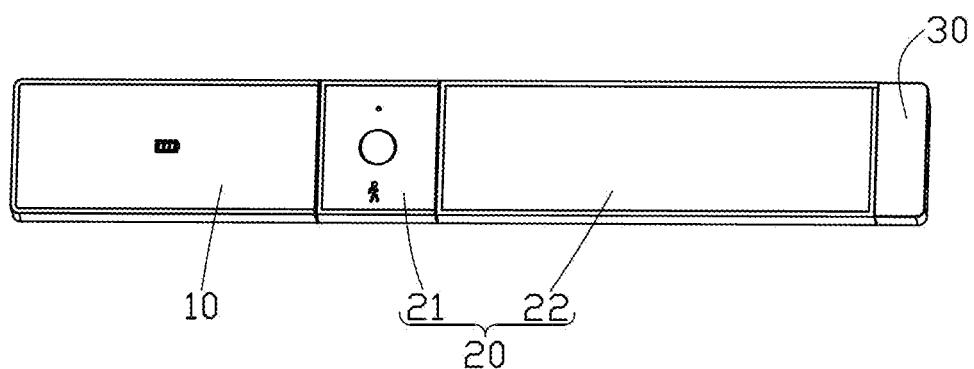
FIG. 7 is a schematic diagram of the detecting device in FIG. 1 used in a third scenario.

Referring to FIG. 7, in the third embodiment, the power supply module 10, the first type module 21 and the second type module 22 are connected successively. The first type module 21 includes a human body detector and the second type module 22 includes a light. When in use, the human body detector detects the target location. When there are people at the target location, the human body detector outputs a detection signal to the light, and the light illuminates upon receiving the signal. This embodiment allows an automatic lighting when someone appears at the target location such as a front door.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A detecting device comprising:
a power supply portion;
a plurality of detecting portions comprising a first type portion, a second type portion and a third type portion, wherein the first type portion is configured for detecting preset parameters, the second type portion is configured for outputting detection results, and the third type portion is configured for controlling conduction paths of the detecting device, the third type portion is located between the first type portion and the second type portion;

wherein each of the plurality of detecting portions comprises an input port and an output port, each of the detecting portions is electrically connectable to the power supply portion, and any two of the detecting portions are detachably electronically connected to each other through the input port and the output port, respectively.

2. The detecting device of claim 1, wherein the first type portion comprises one or more of a human body detector, an optical detector, a combustible gas detector, a carbon monoxide detector, an ultraviolet detector, a tilt detector and a carbon dioxide detector.

3. The detecting device of claim 1, wherein the second type portion comprises one or more of a light portion, a buzzer and an alarm.

4. The detecting device of claim 1, wherein the third type portion comprises a switch controller, the switch controller switches circuits on or off in the detecting device.

5. The detecting device of claim 3, wherein the third type portion further comprises a wireless receiver, the wireless receiver is arranged on the switch controller, and the wireless receiver is configured to receive control signals from the switch controller.

6. The detecting device of claim 1, wherein the detecting device further comprises an external output module comprising the input port and an external port opposite to the input portion.

7. The detecting device of claim 6, wherein the external port comprises a type-C port and/or a micro USB port.

8. The detecting device of claim 1, wherein the cross section of the detecting device is trapezoidal.

9. The detecting device of claim 1, wherein the power supply portion comprises a power supply port and a charging port.

10. A detecting device comprising:
a power supply portion;
a plurality of detecting portions comprising a first type portion, a second type portion and a third type portion, wherein the first type portion is configured for detecting preset parameters, the second type portion is configured for outputting detection results, and the third type portion is configured for controlling conduction paths of the detecting device, the third type portion is located between the first type portion and the second type portion;
wherein each of the plurality of detecting portion comprises an input port and an output port, the output port of one detecting portion is detachably electronically connected to the power supply portion, and the input port of one detecting portion is detachably electronically connected to the output port of another detecting portion.

11. The detecting device of claim 10, wherein the first type portion comprises one or more of a human body detector, an optical detector, a combustible gas detector, a carbon monoxide detector, an ultraviolet detector, a tilt detector and a carbon dioxide detector.

12. The detecting device of claim 10, wherein the second type portion comprises one or more of a light portion, a buzzer and an alarm.

13. The detecting device of claim 10, wherein the third type portion comprises a switch controller, the switch controller switches circuits on or off in the detecting device.

14. The detecting device of claim 13, wherein the third type portion further comprises a wireless receiver, the wireless receiver is arranged on the switch controller, and the wireless receiver is used to receive control signals from the switch controller.

15. The detecting device of claim 10, wherein the detecting device further comprises an external output module, comprising the input port and an external port opposite to the input portion.

16. The detecting device of claim 15, wherein the external port comprises a type-C port and/or a micro USB port.

17. The detecting device of claim 10, wherein the cross section of the detecting device is trapezoidal.

18. The detecting device of claim 10, wherein the power supply portion comprises a power supply port and a charging port.

* * * * *